(12) United States Patent
Grimm et al.

(10) Patent No.: US 11,016,474 B2
(45) Date of Patent: May 25, 2021

(54) CHECKING METHOD, DEVICE, AND COMPUTER PROGRAM PRODUCT

(71) Applicant: SIEMENS AKTIENGESELLSCHAFT, Munich (DE)

(72) Inventors: Stephan Grimm, Munich (DE); Alois Haselböck, Schönbühel-Aggsbach (AT)

(73) Assignee: Siemens Aktiengesellschaft, Munich (DE)

( * ) Notice: Subject to any disclaimer, the term of this patent is extended or adjusted under 35 U.S.C. 154(b) by 86 days.

(21) Appl. No.: 16/464,523

(22) PCT Filed: Nov. 28, 2017

(86) PCT No.: PCT/EP2017/080631
§ 371 (c)(1),
(2) Date: May 28, 2019

(87) PCT Pub. No.: WO2018/099901
PCT Pub. Date: Jun. 7, 2018

(65) Prior Publication Data
US 2019/0377333 A1  Dec. 12, 2019

(30) Foreign Application Priority Data
Nov. 29, 2016 (DE) ............. 10 2016 223 646.6
Dec. 8, 2016 (DE) ............. 10 2016 224 457.4

(51) Int. Cl.
*G05B 19/418* (2006.01)
*G06N 5/02* (2006.01)
*G06N 5/04* (2006.01)

(52) U.S. Cl.
CPC ......... *G05B 19/41885* (2013.01); *G06N 5/02* (2013.01); *G06N 5/04* (2013.01); *G05B 2219/32015* (2013.01)

(58) Field of Classification Search
CPC .... G05B 19/41885; G05B 2219/32015; G05B 2219/32347; G06N 5/02; G06N 5/04; Y02P 90/02
See application file for complete search history.

(56) References Cited

U.S. PATENT DOCUMENTS 6,633,788 B1   10/2003   Riley et al.
7,505,827 B1 *  3/2009   Boddy .................. G06Q 10/06
                                                 700/100

(Continued)

FOREIGN PATENT DOCUMENTS

| DE | 102007042442 A1 | 3/2009 |
| DE | 102008008500 B3 | 9/2009 |
| WO | WO2015074871 A1 | 5/2015 |

OTHER PUBLICATIONS

PCT International Search Report and Written Opinion of International Searching Authority dated Mar. 27, 2018 corresponding to PCT International Application No. PCT/EP2017/080631 filed Nov. 28, 2017.

(Continued)

*Primary Examiner* — Ziaul Karim
(74) *Attorney, Agent, or Firm* — Lempia Summerfield Katz LLC

(57) ABSTRACT

The disclosure relates to a method for checking whether and/or how a technical process may be carried out using a technical system with two or more units having technical capabilities that are potentially relevant to the technical process. At least one ontology is used which describes the technical system and the technical process, and a constraint satisfaction problem is generated using the at least one ontology. In the method, solutions are found for the constraint satisfaction problem. The solutions may be stored or output.

22 Claims, 3 Drawing Sheets

(56) References Cited

U.S. PATENT DOCUMENTS

| | | | |
|---|---|---|---|
| 2010/0185553 A1* | 7/2010 | Fischer | G06N 5/022 |
| | | | 705/348 |
| 2011/0060710 A1* | 3/2011 | Amin | G06F 15/16 |
| | | | 706/13 |
| 2013/0055115 A1 | 2/2013 | Obitko | |
| 2015/0242366 A1* | 8/2015 | Rameau | G06F 30/17 |
| | | | 703/2 |
| 2015/0331851 A1* | 11/2015 | Poli | G06N 5/02 |
| | | | 704/9 |
| 2016/0300137 A1 | 10/2016 | Abele | |

OTHER PUBLICATIONS

Floyd, Robert W. "Algorithm 97: shortest path." Communications of the ACM 5.6 (1962): 345.
German Search Report for German Application No. 10 2016 224 457.4 dated Mar. 6, 2018.
Goldman, Robert P., and Mark S. Boddy. "A constraint-based scheduler for batch manufacturing." IEEE Expert 12.1 (1997): 49-56.
Wikipedia: "Ontologie (Informatik)"; Version. 4. Accessed May 28, 2019.
Wikipedia: Prozess (Technik); Version 7. Accessed May 28, 2019.

* cited by examiner

CHECKING METHOD, DEVICE, AND COMPUTER PROGRAM PRODUCT

The present patent document is a § 371 nationalization of PCT Application Serial No. PCT/EP2017/080631, filed Nov. 28, 2017, designating the United States, which is hereby incorporated by reference, and this patent document also claims the benefit of German Patent Application No. 10 2016 223 646.6, filed Nov. 29, 2016, and German Patent Application No. 10 2016 224 457.4, filed Dec. 8, 2016, which are also hereby incorporated by reference.

TECHNICAL FIELD

The disclosure relates to a method for checking whether a technical process is able to be implemented by way of a technical system. The disclosure also relates to a device and to a computer program product.

BACKGROUND

In the context of the "Industry 4.0" technological development, increasing use is being made of technical systems, in particular cyber-physical production systems, which have modular units that operate in a self-organized manner, (for instance, cyber-physical production units such as "smart machines"), which respond dynamically to new requirements by fitting into a technical process, (for instance, a production process), in novel ways. Based on a predefined technical process, (for example, the production of a particular technical product), a production system may be formed in a self-organized manner from such units without requiring central coordination for this purpose.

Against the background of this technical development, the problem may arise of checking whether a desired technical process is able to be implemented by way of a currently configured technical system having a plurality of units. Such a technical process is, in particular, production of a product. By way of example, it is important, for the production of a product by way of a given cyber-physical production system, whether the cyber-physical production system offers the functionalities required to produce the product. It is furthermore relevant whether all of the production acts are able to be inserted in the correct sequence by way of the topology of the cyber-physical system. In this case, the part list for the product and the work plan for the product additionally have to be able to be fulfilled.

All of the relevant production conditions furthermore have to be able to be fulfilled, in particular, supply times and/or upper limits for transport times between various cyber-physical production units and/or the accessibility of all of the required materials and workpieces for the respective cyber-physical production unit.

The result of such a check is either the statement "the product is not able to be produced" or else the check results in a detailed schedule for the production process that contains all of the production and transport acts for all of the parts of the final product. In particular, such a schedule may not just be able to be implemented technically, but rather the schedule may also be optimized in terms of further technical criteria, in particular, in terms of a minimal production time or in terms of a minimal resource input, (e.g., an energy input).

Such a check as to whether the technical process is able to be implemented by way of the cyber-physical system is in principle similar to a job shop problem or a machine utilization problem, wherein working acts and workpieces are assigned to machines in an optimized schedule. Numerous algorithms that solve such machine utilization problems are known. These algorithms are either specifically tailored to such tasks or are standard methods from the field of operational research, that is to say mathematical planning forecasting or linear programming.

The checking method within the meaning of this application is intended to expand the machine utilization problem in two aspects. It is intended not just to determine an optimized assignment of workpieces to machines, but it is rather also intended to incorporate acceptable and optimized transportation of workpieces between units of the technical system and possibly to a final storage facility. The method is furthermore intended to check whether the technical process is actually able to be implemented using the technical system. Existing methods do not reliably fulfill these two requirements: specifically tailored methods may not be able to be used—changes and/or additions to the problem to be solved rather may cause a complete change to the solution strategy. Other methods may fail in that the methods already do not solve the underlying problem of establishing whether a particular technical process is actually able to be implemented by the technical system.

SUMMARY AND DESCRIPTION

Against this background, the object of the disclosure is therefore to specify an improved method for checking whether and/or how a technical process is able to be implemented by way of a technical system. A further object of the disclosure is to provide an improved device by way of which the method is able to be implemented.

The scope of the present disclosure is defined solely by the appended claims and is not affected to any degree by the statements within this summary. The present embodiments may obviate one or more of the drawbacks or limitations in the related art.

This object of the disclosure is achieved by way of a method for checking whether and/or how a technical process is able to be implemented by way of a technical system, and by way of a device, and by way of a computer program product.

In the method for checking whether and/or how a technical process is able to be implemented by way of a technical system having two or more units each having technical capabilities potentially relevant to the technical process, at least one ontology that describes the technical system and the technical process is applied, and a constraint satisfaction problem is formed by way of this at least one ontology. In the method, solutions to the constraint satisfaction problem are sought and, provided that one or more solutions are found, one or more, (e.g., all), of the solutions are output and/or retained, expediently stored, for further purposes.

The advantage of the disclosure lies in linking symbolic knowledge representation and symbolic reasoning by way of ontologies and sub-symbolic reasoning techniques with constraint solving in order to check whether a technical process is able to be implemented by way of a technical system.

A dynamic comparison of the capabilities required for the technical process with the capabilities provided by the units of the technical system is possible in the ontology by way of explicit capability descriptions, whereas modern technical processes, in particular production processes, may have no or only little flexibility.

The combination of ontologies and of the possibility, connected therewith, of in particular automated symbolic reasoning with the possibility of sub-symbolic constraint solving, is furthermore also novel from a methodical viewpoint described herein.

The strength of constraint solving is that of efficiently calculating sub-symbolic conditions, (in particular, numerical conditions), and providing a number of solutions, wherein the intention is in particular to find a solution that is optimized in a certain respect or that is at least largely optimized.

Constraint solvers may be applied in order to efficiently calculate optimized solutions for working procedures, (in particular, in production), and in order to check sub-symbolic conditions that potentially contain complex numerical calculations.

The strength of logic with ontologies, by contrast, is that of being able to draw conclusions with symbolically represented knowledge on the basis of semantic descriptions.

Ontologies may thus be applied in order to retain the relevant knowledge, in particular, about production capabilities and the requirements in terms of the product design of a product to be produced, conceptually in a manner that is able to be managed and able to be evaluated efficiently by way of symbolic knowledge representation techniques.

Symbolic reasoners, for instance, in the manner of logic units or of computer-based reasoners, may be applied in order to carry out semantic comparisons between the capabilities offered by the units of the technical system and the capabilities required for the technical process by way of logic conclusions, wherein the (potentially) complex semantic structures are able to be configured to ontological capability descriptions.

An easily maintainable knowledge base for a subject area is able to be combined with the efficient calculation ability of constraint solving in a hybrid manner by way of ontologies, such that the intuitive symbolic descriptions of capabilities of the units of the technical system, on the one hand, and also the numerical conditions, which may in particular be incorporated by way of computers, are possible and able to be processed within a single description system.

Standards that are conventional or known in computer-assisted processes involving ontologies, for instance SPARQL query language, make it possible to retrieve the required part of the represented knowledge from a central knowledge base, both by way of the symbolic reasoner and by way of the constraint server.

In the method, the technical system may be a production system and the units of the system may be production units. For production systems, in particular, the method is able to be used to particularly efficiently check whether changes to products to be produced or to production methods are possible by way of an already existing production system. In addition, the method is able to be used to respond in a particularly dynamic manner to changed and/or new requirements. In particular, a production sequence is also able to be organized autonomously by way of a production system, without dedicated human or central coordination being necessary for this purpose.

As an alternative or in addition, the technical system is a controller and/or an automation system and/or an assistance system.

In one embodiment of the method, the constraint satisfaction problem is subjected to filtering of a search space for solutions to the constraint satisfaction problem, e.g., before actual solutions are sought. The search space for solutions is thus able to be kept sufficiently small and thus sufficiently manageable that an efficient search, e.g., for optimizing quality criteria, such as a shortest possible production time and thus supply time, a production that is as inexpensive as possible, consumes as few resources and/or as little energy as possible, etc., is possible.

In the method, the filtering is suitably performed by way of constraint reasoning, in particular, by way of a constraint reasoner, and/or by way of semantic reasoning.

In the method, the semantic reasoning may be performed by way of a semantic reasoner that at least partly applies the ontology.

In the method, the at least one ontology expediently includes two or more or all of the units of the system and/or capabilities in relation to at least one or more or all of these units and, in certain examples, in relation to one or more or all other conditions for the technical capabilities of these units that exist for these units.

In the method, the at least one ontology suitably includes a topology of the technical system.

In one embodiment of the method, the at least one ontology includes planning information of the technical process, in particular, a work plan and/or a part list for a product to be produced.

In the method, in one development, solutions to the constraint satisfaction problem are advantageously sought that optimize one or more quality and/or optimization criteria, in particular a duration of the technical process, (e.g., a production time), and/or a resource input, (e.g., an energy input).

In the method, the constraint satisfaction problem may include at least one constraint, that is to say a condition, e.g., in the form of a capability matching condition. Capability matching condition means the requirement for capabilities offered by units of the technical system, such as production capabilities, to match the capabilities required for the technical process, so that the technical system is capable of implementing the technical process.

It is understood that the term "capability" in the context of this application may be understood to mean a technical capability, e.g., a production capability.

In the method, the constraint satisfaction problem suitably includes at least one constraint, that is to say a condition, in the form of a combinatorial and/or numerical consistency condition. Such combinatorial and/or numerical conditions or—synonymously—consistency conditions expediently mean that the capability offered by a unit in terms of its parameters has to be compatible with the capability required by the technical process.

In the method, the constraint satisfaction problem may include at least one constraint, that is to say at least one condition, in the form of a unit condition or transfer condition. In particular, units have to be able to transfer material, (e.g., workpieces), in order to perform an intended sequence of sequence acts on suitable further units. Physical units that are incompatible with one another per se in the description of the capabilities required by the technical process and offered by units of the technical system also have to be converted to a common unit system.

The device is designed for the computer-assisted execution of a method such as described above. The device has a knowledge base having at least one ontology that describes the technical system and the technical process. The device additionally has a constraint satisfaction problem generator that is designed to apply data of the at least one ontology and to generate a constraint satisfaction problem. The device furthermore includes a constraint solver that is designed to solve the constraint satisfaction problem.

The device may include a filter for filtering a search space for solutions to the constraint satisfaction problem. The filter may have a constraint reasoner and/or a semantic reasoner.

The computer program product is designed to perform a method such as described above.

BRIEF DESCRIPTION OF THE DRAWINGS

The disclosure is explained in more detail below with reference to exemplary embodiments illustrated in the drawings.

DETAILED DESCRIPTION

In the exemplary embodiments illustrated below, the technical process constitutes production of a product and the technical system is a cyber-physical production system having a multiplicity of cyber-physical production units that each have production capabilities for product production.

In further exemplary embodiments that are not specifically illustrated, the technical system may also in principle be a controller and/or an automation system and/or an assistance system. The explanations for the exemplary embodiment explained here accordingly apply to such systems.

In the present exemplary embodiment, it is questionable as to whether—and possibly how—a new technical product is able to be produced using the predefined cyber-physical production system, that is to say by way of the cyber-physical production units thereof.

Figure 1:
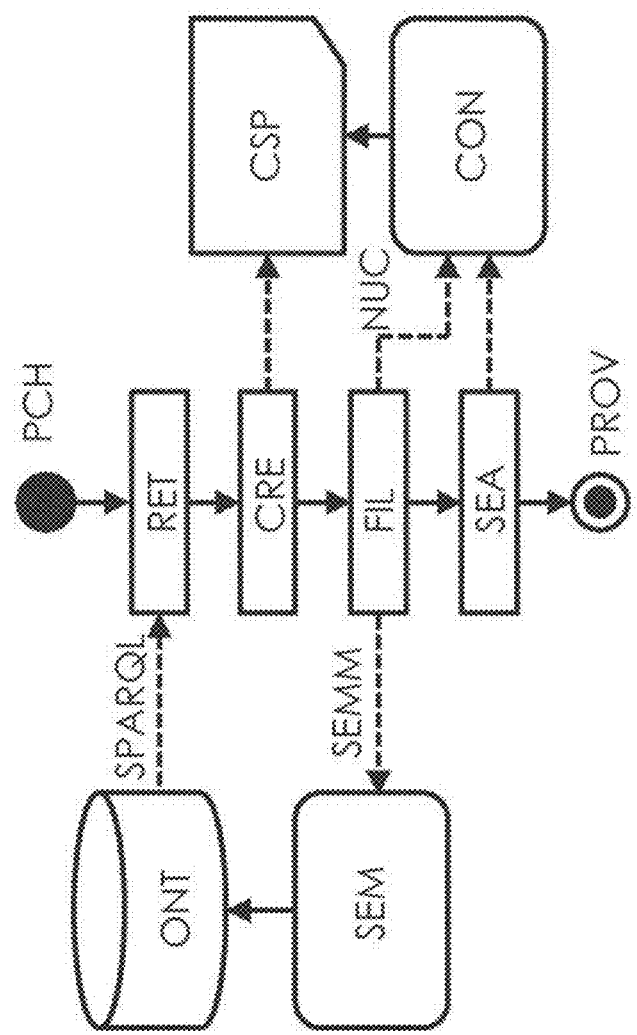
FIG. 1 depicts the method according to an example for checking whether a technical process is able to be implemented by way of a technical system having a plurality of units, in a schematically illustrated flowchart.

To answer this question, the method, as illustrated in FIG. 1, is executed as follows.

A process planning device (not explicitly shown) starts the method for checking whether the technical process is able to be implemented by way of the technical system, by way of a start signal PCH.

As already mentioned above, in the exemplary embodiment that is shown, the technical process is the production of a product, wherein the technical system is a cyber-physical production system. The knowledge about this cyber-physical production system is retained as a digital twin. To this end, the cyber-physical production system is described digitally by way of an ontology ONT. This ontology ONT retains the knowledge about all of the cyber-physical production units, their respective production capabilities, and the product data in a hierarchy of terms, for example, the type of hierarchical subsumptions: the term "assembly" thus includes the term "fastening", this in turn includes the term "pressing on", which in turn includes the term "screwing on". Such terms are furthermore additionally assigned properties and conditions. The type of such terms and the occurrences thereof (that is to say, the respective cyber-physical production units or the respective workpieces in their respective current state) together form, with their respective properties and respective conditions, the digital twin of the cyber-physical production system.

After the start of the method, a dataset is requested from the ontology ONT both of the cyber-physical production system with its cyber-physical production units and of the part list and of the work plan BOP of the product to be produced in a method act RET through querying, for example by way of SPARQL requests. The dataset that is obtained as a result contains all of the cyber-physical production units of the cyber-physical production system, their respective production capabilities and the conditions CST underlying the production capabilities, the topology of the cyber-physical production system, in particular the "is connected to" relationships between adjacent and/or related cyber-physical production units CPPU, and the part list BOM and the work plan BOP for the product to be produced.

A constraint satisfaction problem CSP is modeled from this dataset in act CRE. In this case, the constraint satisfaction problem CSP is formulated in the language of the constraint solver that is to be applied. MiniZinc is used as language for this purpose, for example.

The search space for searching for a solution to the constraint satisfaction problem CSP is subjected to filtering by way of the method act FIL: the search space has the structure of a search tree. During the filtering, branches of the search tree that obviously cannot lead to a solution are removed prior to a further search within this branch. By way of example, cyber-physical production units that are not able to execute a particular production act, (e.g., because conditions underlying the respective production capability of the cyber-physical production unit do not allow the currently required production act to be executed in the intended manner), are removed from a further search for this production act. The filtering FIL thus reduces the search space to be searched.

The comparison required for such filtering FIL includes two criteria. For one criterion, it is determined whether the respective cyber-physical production unit under consideration actually offers the required production capabilities to execute the respective production act. This criterion is checked by way of semantic matching SEMM with the aid of a semantic reasoner SEM on a symbolic level.

As a further criterion, it is checked whether all of the consistency conditions that are contained within the ontology ONT are able to be fulfilled. Such conditions may be formulated by way of numerical conditions, (e.g., numerical intervals), that are able to be answered by way of constraint propagation of the constraint reasoner CON. These numerical conditions are then checked, that is to say subjected to numerical checks NUC, by way of the constraint reasoner CON.

One or more optimized solutions are calculated by way of the constraint solver in act SEA. In this case, optimization is performed by way of a quality indicator, for instance, a production duration or an energy input, in particular so as to minimize such a quality indicator.

The result of the check is output by a user interface (not specifically illustrated) by way of the act PROV. The check may on the one hand lead to the result "product not able to be produced" if the constraint satisfaction problem CSP is not able to be solved. If not, a list of the N, (e.g., five), best solutions is output as result of the check. The solutions in this case include the complete schedule for the production, in particular, a sequence of production acts and transport acts.

The abovementioned ontology ONT is designed as follows. Ontologies in general retain knowledge about various subject areas in a manner that is easily able to be retrieved and processed. Ontologies include conceptual models that denote terms and their relationships with one another in a subject area and allow a logic axiomatization of the semantic structures. For the case of producing a product, the ontology that is applied includes the structure of the cyber-physical production system and product-related information in a manner that makes it possible to automatically compare the production capabilities. To this end, the ontology includes the following terms.

"Device" in ontologies refers to a production unit, that is to say a technical appliance that offers a production capability.

The term "material" includes all materials and product parts, (e.g., individual parts), that are processed and/or treated by way of the devices on the path to the final product.

"Working act" includes one or more production acts that are necessary to implement a work plan for producing the product.

"Production capabilities" include capabilities of the devices that are described expressly and are offered or provided in cyber-physical production systems for production purposes or are necessary to execute a working act.

Figure 2:
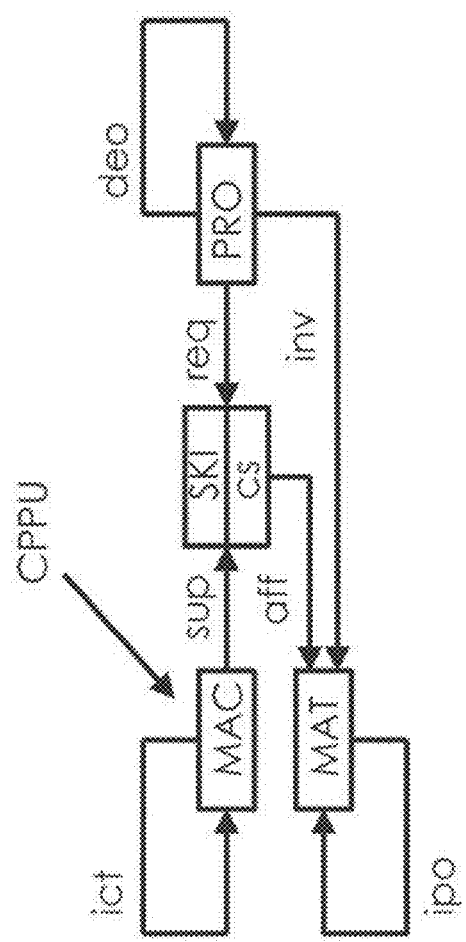
FIG. 2 depicts an example of a schematic illustration of the ontology of the technical system and of the technical process according to FIG. 1 in the form of a production of a product in a class diagram compatible with the Unified Modeling Language (UML).

The class diagram illustrated in FIG. 2 includes classes in relation to the abovementioned ontological terms and their ontological relationships with one another, and are expressed in Unified Modeling Language UML.

The term of a production capability is described in UML language by way of relationships with other terms. A production capability is thus supported by particular devices, (for example, a production capability "drilling" is supported by a "lathe"). That is to say, a production capability is related to one or more devices by way of an "is supported by" relationship. A production capability is furthermore related to further terms, for instance, to further production capabilities, by way of an "is necessary for" relationship. By way of example, the production capability "joining" has an "is necessary for" relationship with the production capability "press-fitting", that is to say press-fitting is necessary for joining. A production capability may furthermore have an "influences" relationship with particular materials. By way of example, the production capability "fastening", (in particular, "press-fitting"), influences a workpiece such that workpieces are joined so as to form an assembly able to be handled in one piece.

In UML ontology language, the term "device" may also be referred to using "machine". The tern "working act" may be referred to using the term "process". The term "production capability" may be referred to using the term "capability" or "skill". The term "material" informally includes, in particular, workpieces and materials.

Terms may furthermore also have self-referencing relationships with components or other occurrences of the term:

Devices MAC as illustrated in FIG. 2 may thus be connected to other devices MAC, that is to say have an "is connected to" relationship ict with other devices MAC.

Working acts PRO may have relationships with other working acts PRO, by way of an example in a dependency relationship "depends on" relationship deo on other working acts PRO. By way of example, method acts may depend on the successful execution of a preceding method act.

Material MAT in the form of a workpiece may furthermore be able to be broken down into individual parts that each likewise form material MAT in the manner of a workpiece. That is to say, material MAT may be in an "is part of" relationship ipo with further material MAT.

In addition, production capabilities SKI may also be linked to the materials MAT by way of the "influences" relationship aff That is to say, the production capability SKI influences the material MAT. Working acts PRO may additionally be related to materials by way of the "incorporates" relationship inv. That is to say, the working act PRO incorporates the material MAT. The production capabilities SKI may additionally have underlying conditions that are described for instance in the form of character strings cs.

Ontologies furthermore make it possible to construct hierarchical classifications (e.g., taxonomies) by way of ordering or subsumption. Such a classification is established, in the illustrated exemplary embodiment, for all of the abovementioned terms.

The term device MAC, in particular, includes the more specific case of a production unit CPPU that, as an even more specific subcase, includes a transport unit, which may, in an even more specific case, be a conveyor belt. The term "material" MAT, in particular, includes a workpiece that may be formed for instance as a single part, which may be present as a "screw" in a specific case.

A working act PROC divides into more specific working acts PROC, (for example, a production method), which in turn, as a specific subcase, includes an automated production method, which, in an even more specific subcase, may be a joining method for joining two workpieces.

Production capabilities SKI form, for example, the subcase of a capability and, for their part, include, as specific subcase, the production capability "assembly", which, in an even more specific subcase, may be the production capability "press-fitting".

These terms and relationships between these terms, as illustrated in FIG. 2, form, together with the abovementioned classification system in the respective subject areas, a formalization of the knowledge in these subject areas, and form a basis for a formalized comparison of necessary production capabilities SKI with available production capabilities SKI of the cyber-physical production system.

The ontology ONT is furthermore supplemented by conditions that are expressed in a constraint satisfaction language. These conditions each form combinatorial and/or numerical additional information for ontologically representing the respective production capabilities SKI. A complete representation of the available functional capabilities SKI of the cyber-physical production system is thus obtained.

In the illustrated exemplary embodiment, it is the intention to use the cyber-physical production system to produce a product in the form of a toy car. To this end, the part list for the toy car provides the individual parts "axle", "wheel", and "screw". For each of these individual parts, there is an individual work plan, for instance, the screw first of all has to be printed by way of a cyber-physical production unit in the form of a 3D printer (not explicitly illustrated). In this case, form and color are contained in the work plan.

Figure 3:
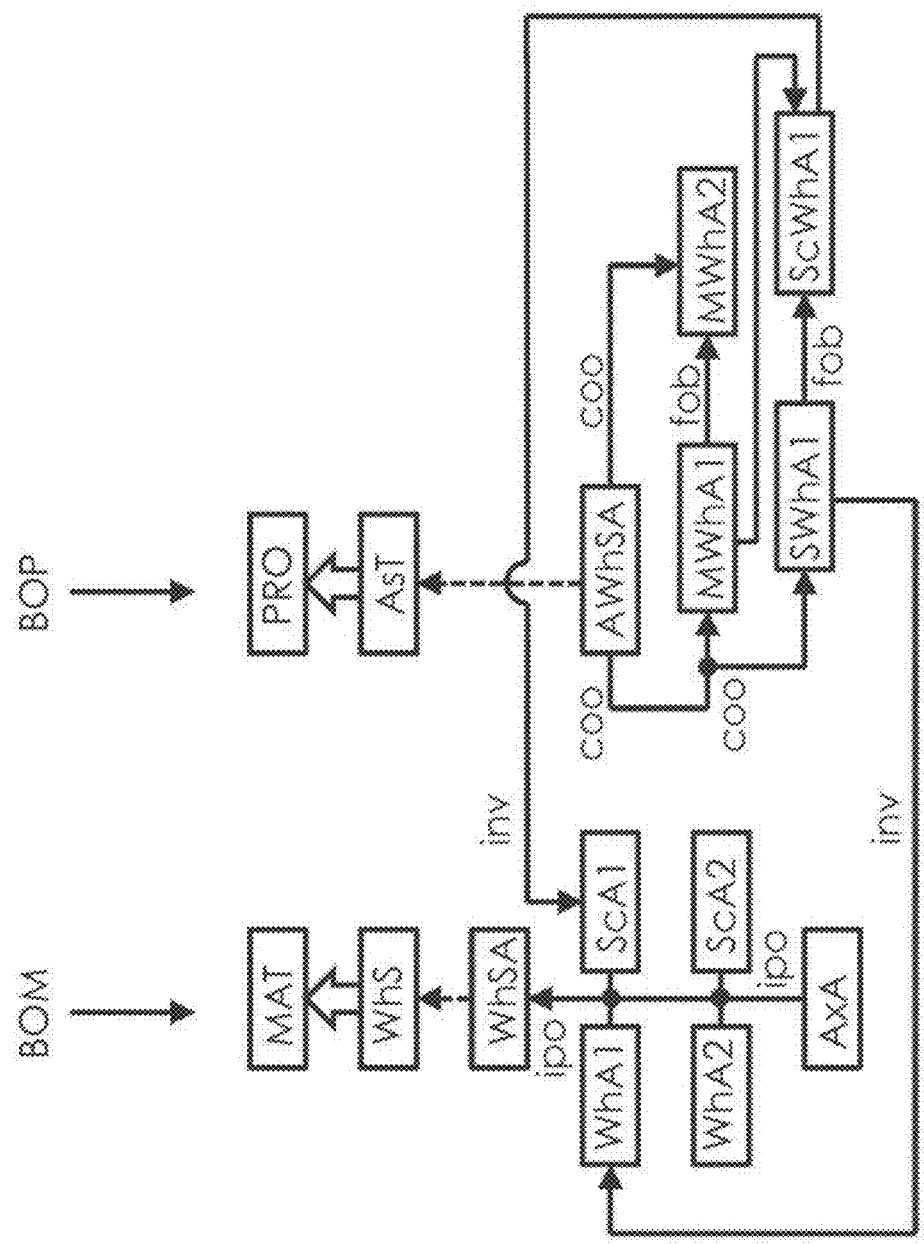
FIG. 3 schematically depicts an example of a part list and a work plan for the product of the technical process according to FIG. 2 in a class diagram.

The assembly of screws, wheels, and axle to form a wheelset is described in FIG. 3.

The work plan BOP for the wheelset first of all includes, as working act PRO, the task "assemble" AsT. The task "assemble" AsT contains "assemble a wheelset" as production act AWhSA. This act AWhSA includes—illustrated by the "includes" relationship coo—the production acts "attach a first wheel" MWhA1 and "attach a second wheel" MWhA2, the latter production act following the first production act and following the first production act by way of a "followed by" relationship fob.

The production act AWhSA furthermore includes the production acts "arrange first wheel on axle" SWhA1 and "screw first wheel onto axle" ScWhA1, which are included within the production act "attach the first wheel" MWhA1 and are linked thereto by way of "includes" relationships coo. The production act ScWhA1 additionally follows the production act SWhA1 by way of the "followed by" relationship fob.

The production act "screw on first wheel" ScWhA1 contains the subject "first screw", which is linked to the production act ScWhA1 by way of a "contains" relationship inv. The production act is additionally linked to the subject "first wheel" WhA1 by way of a "contains" relationship inv.

The abovementioned subjects and the subjects "second screw" ScA2, "second wheel" WhA2 and "axle" AxA are part of the single part "wheelset" WhSA and are related thereto by way of "is part of" relationships ipo. The subject "wheelset" WhSA is part of an entry WhS of a material MAT of a part list BOM for the toy car.

The method for checking whether the technical process is able to be implemented by way of the cyber-physical system may be formulated as a constraint satisfaction problem: a constraint satisfaction problem CSP conventionally includes variables, their respectively associated value range and the conditions that exist for them. In the illustrated case, in which the technical process is a production method, the variables relate to production acts, wherein their value range is given by the cyber-physical production units CPPU of the cyber-physical production system, which have production and transport capabilities. Conditions include those restrictions to which a production capability SKI of a cyber-physical production unit CPPU is subject during the execution of a production act. A solution is understood to be a variable assignment in which each production act is assigned a value for a cyber-physical production unit CPPU, by way of which all of the conditions are respectively able to be fulfilled. In the illustrated case, in which the technical process is a production method, a solution includes respectively assigning a cyber-physical production unit CPPU having a suitable production capability to each required production act. As is known, such a formulation of a constraint solution problem CSP is accessible to numerous efficient and robust solution techniques. Such solution techniques include, for example, constraint propagation, complete search, or local search.

To formulate the CSP, the variables listed below from the ontology ONT are applied as input variables: a dataset S includes a matrix of all of the required production acts, which are each represented as an integer, and a table of parameters of these production acts. For example, the production act "drilling" contains, in addition to further parameters, the parameters "diameter", "depth", and "force".

Furthermore, an array of all of the cyber-physical production units CPPU of the cyber-physical production system is applied as input variable, each of which are denoted for example by integers, and a set of production methods and conditions that are formulated such that they are able to be processed by a constraint solver. Such conditions may be parameters of the production capabilities SKI, which are present for instance in the form of "diameter≥0.005 and diameter≤0.3" for the production capability "drilling". This means that the cyber-physical production unit CPPU is only able to drill holes that have a diameter of at least 5 mm and at most 3 cm. Further input variables are formed by the "is connected to" relationships ict of the cyber-physical production units CPPU with one another, which define the topology of the cyber-physical production system. In such a topology, workpieces may be transferred only from cyber-physical production units CPPU to cyber-physical production units CPPU that are related to one another by way of an "is connected to" relationship ict. Such "is connected to" relationships ict may be expressed as directional relationships, and the topology of the cyber-physical production system may thus be described as a directional graph.

From such a graph, it is possible to calculate a quadratic matrix M that retains the shortest paths between cyber-physical production units CPPU, such that these shortest paths are able to be directly applied during the constraint solving. In the exemplary embodiment that is shown, each line index and each column index of the matrix M denotes a cyber-physical production unit CPPU. The entry M(i,j) of the matrix M accordingly indicates the distance of the shortest path from the cyber-physical production unit i to the cyber-physical production unit j. In further exemplary embodiments that are not specifically illustrated, the matrix M, instead of the shortest paths between cyber-physical production unit, may also retain other performance indicators, in particular, the transport time of a workpiece from the cyber-physical production unit i to the cyber-physical production unit j. The matrix M may also contain the required energy input to transport the workpiece from the cyber-physical production unit i to the cyber-physical production unit j as inputs. An input −1 of the matrix M expediently denotes the state that it is not possible to transport the workpiece from the cyber-physical production unit i to the cyber-physical production unit j. There are numerous algorithms that are able to be efficiently implemented and that are able to derive such a matrix M of shortest paths from an installation topology. By way of example, such an algorithm is disclosed by Floyd (Floyd, Robert W.: Algorithm 97: Shortest path. Commun. ACM 5(6): 345 (1962)).

In the exemplary embodiment that is shown, the variable v_act[i] is applied, which assigns a cyber-physical production unit CPPU to an i-th production act v_act[i]. To this end, this variable takes the respective number of the cyber-physical production unit CPPU from a consecutive enumeration of cyber-physical production units CPPU of the cyber-physical production system as values. An assignment v_act [i]=j accordingly indicates that the production act numbered i is executed by a cyber-physical production unit j.

In the exemplary embodiment that is shown, the following types of condition are then specifically present:

A first type of condition indicates that a cyber-physical production unit CPPU is able to execute a particular production act only when the cyber-physical production unit CPPU actually has the corresponding production capability SKI. In the simplest type, such a production capability SKI may be present as a character string cs (FIG. 2) that nominally denotes the production act and the production capability SKI of the cyber-physical production unit CPPU, (for example, "assembly"). The production capabilities of the cyber-physical production units CPPU may expediently be retained in a significantly more flexible and semantically more complex manner, by applying classification (or synonymously: taxonomy) of production capabilities. In this case, semantic reasoning may be applied in order to carry out a semantic comparison between the required production capabilities SKI and the offered production capabilities SKI of the cyber-physical production units CPPU. The comparison variable Semantic_Match(v_act[i], u) takes the value "true" when the cyber-physical production unit u has a production capability that is able to be applied in order to execute the production act v_act[i].

In the exemplary embodiment that is shown, numerical consistency conditions are also present:

These numerical consistency conditions are part of the capability description of the respective cyber-physical production unit CPPU under consideration and further define the production capabilities of this cyber-physical production unit CPPU. If a particular production act is executed by the cyber-physical production unit u, that is to say if the production act v_act[i] is thus able to be executed by the cyber-physical production unit u, then the more stringent numerical consistency restrictions continue to have to be observed, that is to say for example in the case of the production capability "drilling", the production unit u may only drill for instance holes of at least 5 mm diameter and at most 3 cm diameter. Such numerical consistency conditions may take the form of an equation or inequality that contains numerical parameters, in particular, of the type "diameter≥0.005 & diameter≤0.03". An evaluation of this corresponding production act "drilling" of the work plan replaces the placeholder "diameter" with the actual diameter as is specified in the production act. The numerical consistency condition is therefore able to be easily and immediately checked by evaluating a numerical expression.

Transfer conditions furthermore exist. It is thus possible to describe a part list BOM for the toy car as a tree. The toy car includes individual parts that in turn themselves have individual parts, etc. Each individual part of this tree requires a list of production acts that have to be performed one after another in sequence. An operating procedure condition thus exists for each pair of consecutive production acts that provides that a particular order of production acts is possible. That is to say, it is possible to transfer a workpiece from the first cyber-physical production unit CPPU to the second cyber-physical production unit CPPU. If $s_i$ and $s_j$ are such consecutive production acts, the operating procedure condition is able to be expressed as $M[s_i, s_j] > 0$ by way of the matrix of shortest paths M. Similar operating procedure restrictions may be derived from assembly acts or mixing acts. The respective individual parts that have to be assembled or materials that have to be mixed with one another have to be able to simultaneously reach that cyber-physical production unit that carries out the assembly or the mixing.

For the sake of simplicity, further conditions such as time conditions (for example, such that the act $s_i$ has to be performed within three minutes following the end of the production act $s_j$) or volume conditions for the production or optimization criteria are not intended to be explicitly taken into consideration here. A solution to the constraint satisfaction problem CSP forms a work plan for the toy car to be produced using the cyber-physical production system. If all of the cyber-physical production units are retained as a digital twin, then the toy car is able to be produced in accordance with the work plan BOM that has been calculated by way of the constraint solver.

The comparison of the required production capabilities SKI with the production capabilities SKI provided by the cyber-physical production units CPPU is explained in more detail below:

For the filtering act FIL indicated in FIG. 1, both symbolic reasoning acts and ontological descriptions of production capabilities SKI and constraint solving strategies, by way of which the semantic retained production capabilities SKI are taken into account in the classifications, are applied. The search space of the CSP is reduced by way of the filtering act FIL for the problem to the extent that the constraint solver is able to efficiently handle this task.

Instead of a simple comparison of character strings between capability descriptions of the work plan and the cyber-physical production unit, a semantic comparison is performed on the production capabilities SKI retained in the classifications (taxonomies). Hereinafter, $S_{req}$ denotes a conceptual expression of a production capability SKI required in a work plan and $S_{sup}$ denotes a conceptual expression of a production capability SKI provided by a cyber-physical production unit CPPU.

One example of such a conceptual expression of a production capability SKI is the following expression, which is able to be formulated in Web Ontology Language (OWL) and describes the production capability "fastening resulting in a workpiece that has a round-headed screw as an individual part":

Fastening and affectsResultingMaterial only (Workpiece and inverse(isPartOf) some RoundheadedScrew).

A semantic reasoner is applied in order to check whether $S_{req}$ and $S_{sup}$ have a specific semantic connection with one another against the background of the knowledge in the ontology ONT. In the case of Web Ontology Language as ontology language, it is possible to apply what is known as a standard description logic reasoner in order to check this semantic connection. The following semantic links may be applied, which are already known per se for establishing matches:

An equivalency match is first of all able to be applied: the ontology ONT contains the equivalency $S_{req} \equiv S_{su}$'. That is to say, the two expressions are semantically equivalent.

It is furthermore possible to apply a specialization match: the ontology ONT contains the relationship $S_{req} \subseteq S_{sup}$'. That is to say, the required production capability $S_{req}$ is a special case of the provided production capability $S_{sup}$.

It is additionally possible to apply a generalization match: the ontology ONT contains the expression $S_{req} \supseteq S_{sup}$'. That is to say, the expression for the required production capability $S_{req}$ is a generalization of the expression for the provided production capability $S_{sup}$.

A compatibility match $S_{req} \cap S_{sup}$ also exists, which is fulfilled with respect to the ontology ONT when the expression for the required production capability $S_{req}$ has a common field of overlap with the expression for the provided production capability $S_{sup}$, that is to say, in particular, when the two production capabilities have a matching specialization contained in their respective expressions.

By way of a match in accordance with one of the matching criteria described above, it is possible to define the degree of matching that may be applied by the constraint solver.

The numerical conditions are likewise derived from the ontology ONT. The numerical conditions are however only applied to an extent that they relate to a single variable. A numerical condition is, in particular, a truth value of a variable for the production act v (also referred to elsewhere in this application as v_act). The value range for the variable v extends to all of the cyber-physical production units CPPU of the cyber-physical production system. For each cyber-physical production unit u for which the assignment is possible in production act v, an expression c is only true when the cyber-physical production unit u is able to execute production act v. In other words, the expression c(v |u) [that is to say: u is assigned to v] is true precisely when the cyber-physical production unit u is able to execute production act v under the condition c(v). The result "false" means by contrast that the cyber-physical production unit u is not a candidate to execute production act v, and is therefore able to be removed from the value range for the variable v of the production act.

The expression c(v) is a Boolean function that may include numerical expressions and operations and Boolean operations, such as "and" and/or "or" and/or "follows from" and/or "not" (negation) as to functional capabilities of cyber-physical production units CPPU and parameters of the toy car.

By way of example, the condition "the force that is provided by an assembly capability of a cyber-physical production unit CPPU (for instance a robot) is at least 10 percent greater than the force that is required in a production act in the form of an assembly act" is considered.

If $force_{sup}$ means the force that is provided by the cyber-physical production unit CPPU and $force_{req}$ means the force that is required by the assembly act, then the condition $force_{sup}$>=$force_{req}$ 1.1 forms a true or a false statement for each combination of an assembly capability provided by a CPPU and a production act, forming an assembly act, of the work plan BOP.

The filtering FIL of the cyber-physical production units CPPU from the value range for the variable v expressing the production act is performed by way of a for-loop:

```
procedure numeric_match (v) { //Numerical check for
    //a given
    //production act:
    for (cppu in domain (v)) //For all CPPUs in the
    //value range of v
      for (c in constraints (cppu))
        //for each condition c
        if (c(v |cppu) == false)
          //If CPPU condition
          //not fulfilled
          remove cppu from domain(v)
          //remove CPPU from the
          //value range of v.
}
```

In this case, the pseudocode indicated above is explained, after each act, with informal comments introduced using "//".

For the sake of illustration, a production capability of a robotic arm U2 ($S_{sup}$) is for instance represented such that a logic expression behind the ontological term "U2_Skill" axiomatizes that the cyber-physical production unit CPPU "U2 robot" offers the production capability "screw such that the resultant workpiece, as an individual part, has a flat head of 5 millimeters". This informally means that the cyber-physical production unit CPPU "U2 robot" is a robot that is able to assemble workpieces by way of a screwing device with the aid of a magazine that is based on the specified screw type "flat-headed" with a set length.

A production capability required in the work plan BOP for the production act ScWhA1 ($S_{req}$) is, for example, stored in the ontology ONT such that the associated logic expression axiomatizes that this production act means "fastening such that the resultant workpiece, as an individual part, is a screw that is not a round-headed screw, having a length of at least 5 millimeters and at most 7 millimeters". As a rule, the conditions in the work plan BOP may not be as strictly worded as conditions for the respective capability of the cyber-physical production unit CPPU.

Standard programming interfaces or querying languages, (in particular, SPARQL), may be used in order to apply all of the required data of the ontology ONT to form the constraint satisfaction problem CSP. Because solution strategies for constraint satisfaction problems CSP may be optimized so as to work with integers and enumerations, the first act in solving a constraint satisfaction problem may be that of referencing the various production units CPPU of the system with integers, for example, in the form of an index.

Each variable v_act[i] denotes a production act numbered i to which an integer value j is assigned that indicates the respective cyber-physical production unit CPPU.

The value range of each v_act[i] variable is first of all equated to the set U (all of the cyber-physical production units CPPU, that is to say, all of the cyber-physical production units CPPU constitute candidates for the respective production act).

In addition to these variables, capability conditions are retrieved from the ontology ONT, which are instantiated with their respective parameter values of the production act.

By way of example, if the capability that a production unit, (e.g., a robot), has the capability of joining two workpieces to one another with a force that is at least 10 percent greater than the force required for the assembly, then the associated capability condition is given as: $force_{CPPU}$>=v_ac[i].force*1.1

In this case, the expression v_act[i].force stands for the force that is required for the production act MWhA1. The parameter values are taken from the work plan BOP for the toy car.

In the filtering FIL of the method, the value ranges for the v_act variables are reduced as far as possible. In each case, just that part of the value range that contains cyber-physical production units CPPU that are actually designed to execute the respective production act are intended to be available for the further performance of the method.

This reduction of the value range, (that is to say, the filtering FIL), is carried out by way of two acts.

In one act, a symbolic comparison is carried out by way of the semantic reasoner SEM in order to find suitable CPPUs. To this end, semantic matching is performed for each required production capability SKI from $S_{req}$ of all production acts expressed as v_act and for all of the provided production capabilities SKI of the CPPU of the ontology ONT, such that the matching function Semantic_Match(ONT, $S_{req}$, $S_{Sup}$) is retrieved. All of the values of the value range that belong to CPPUs that are not able to provide a suitable production capability SKI are removed from the value range.

In the example described above, a subsumption match is given between the provided production capability SKI of the CPPU in the form of the robot U2 having a required capability in the work plan BOP. The semantic reasoner SEM concludes that the ontology ONT contains the fact that $S_{req} \supseteq S_{sup}$. That is to say, the production capability provided by the CPPU is a specific case of the production capability SKI required by the work plan BOP. Depending on the stringency of the algorithm, a match, (that is to say, a match within the meaning of the subsumption match), may be concluded therefrom.

The positive match in this case results from the compatibility of the types of screws ("flat-headed" matches "not round-headed"), their matching lengths (5 millimeters is contained within the interval of at least 5 millimeters and at most 7 millimeters), and their compatible references in the taxonomy of the production capabilities ("screwing" is a specific case of "fastening").

The numerical check is performed by the constraint reasoner CON in order to exclude those remaining CPPUs from the value range for the variables for the production act that infringe one or more conditions.

Examples of such numerical conditions are for instance physical conditions: "a capability 'drilling' of a particular CPPU is only able for example to drill holes having a diameter of at least 5 millimeters and at most 3 centimeters in the workpiece."

In the exemplary embodiment that is shown, unit conditions may furthermore be applied. Units of physical parameters of a description of a capability of a cyber-physical production unit CPPU may differ from the physical units of a description of a required production act of a work plan BOP. If such units are used in an expression for a condition, then the variables affected by units may be converted into a common unit system, for instance into SI units.

In the exemplary embodiment that is shown, it is additionally possible to use spatial conditions. By way of example, a quaternionic algebra may be used that is suitable, in an efficient manner, for 3D representations and orientations in the robot kinematic system relevant to the production. The spatial description (e.g., linear translation and angular rotation) of the actuator of a robot manipulator in relation to a fixed reference coordinate system may be performed by way of quaternions in a highly adapted manner. The start and end orientation of an assembly production act may likewise be expressed using quaternions.

After the symbolic and numerical filtering FIL, the value range for the variable $v\_act[i]$ representing the production acts contains only those cyber-physical production units CPPU that are capable of executing the production act.

If at least one of the definition ranges of a variable is empty, the constraint solving problem is unsolvable, because there is not a cyber-physical production unit CPPU having the required capability in the cyber-physical production system.

If all of the variables have definition ranges that are not empty, then a corresponding search routine of the constraint reasoner CON initiates the search for one or all of the solutions to the filtered constraint solving problem.

Most conventional constraint solvers offer such a search functionality. The result is either "not able to be produced" (because, for example, there are not the required transport connections between production units) or the result is at least one or more complete assignments of cyber-physical production units CPPU to production acts.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for checking an implementation of a technical process by a production system having a plurality of production units, each production unit having technical capabilities potentially relevant to the technical process, the method comprising:
    applying, by a production unit of the plurality of production units of the production system, at least one ontology that describes the production system and the technical process;
    forming a constraint satisfaction problem, comprising at least one constraint in a form of a capability matching condition, by way of the at least one ontology, wherein the capability matching condition is defined by a requirement for the technical capabilities offered by the plurality of production units of the production system to match capabilities required for a required technical process, so that the production system is capable of implementing the required technical process;
    determining solutions to the constraint satisfaction problem according to the capability matching condition;
    assigning a production unit having a suitable technical capability to the required technical process when the capability matching condition is fulfilled, indicating that the production system is capable of implementing the required technical process; and
    storing or outputting the determined solutions.

2. The method of claim 1,
    wherein the production system is a controller, an automation system, an assistance system, or a combination thereof.

3. The method of claim 1, further comprising:
    filtering a search space for the solutions to the constraint satisfaction problem.

4. The method of claim 3, wherein the filtering is performed by way of constraint reasoning, semantic reasoning, or a combination thereof.

5. The method of claim 4, wherein the semantic reasoning is performed by way of an ontological reasoner, a semantic reasoner, or both the ontological reasoner and the semantic reasoner that at least partly applies the ontology.

6. The method of claim 4, wherein the constraint reasoning is performed by way of a constraint reasoner.

7. The method of claim 3, wherein the filtering is conducted before the determining of the solutions to the constraint satisfaction problem.

8. The method of claim 1, wherein the at least one ontology comprises the plurality of production units of the production system and/or capabilities in relation to at least one or more production units or all of the production units of the plurality of production units.

9. The method of claim 8, wherein the at least one ontology further comprises capabilities in relation to one or more conditions or all of the conditions for the technical capabilities that exist for the plurality of production units.

10. The method of claim 1, wherein the at least one ontology comprises a topology of the production system.

11. The method of claim 1, wherein the at least one ontology comprises planning information of the technical process.

12. The method of claim 11, wherein the planning information comprises a work plan, a part list, or both the work plan and the part list for a product to be produced.

13. The method of claim 1, wherein the determined solutions to the constraint satisfaction problem optimize one or more optimization criteria.

14. The method of claim 13, wherein the one or more optimization criteria comprise a duration of the technical process, a resource input, or a combination thereof.

15. The method of claim 14, wherein the duration of the technical process is a production time.

16. The method of claim 14, wherein the resource input is an energy input.

17. The method of claim 1, wherein the constraint satisfaction problem further comprises at least one constraint in a form of a combinatorial consistency condition, a numerical consistency condition, or a combination thereof.

18. The method of claim 1, wherein the constraint satisfaction problem further comprises at least one constraint in a form of a forwarding condition.

19. A device configured to check an implementation of a technical process, the device comprising:
   a knowledge base having at least one ontology that describes a production system and the technical process;
   a constraint satisfaction problem generator that is configured to apply data of the at least one ontology and to generate a constraint satisfaction problem comprising at least one constraint in a form of a capability matching condition, wherein the capability matching condition is defined by a requirement for technical capabilities offered by a plurality of production units of the production system to match capabilities required for a required technical process, so that the production system is capable of implementing the required technical process; and
   a constraint solver that is configured to solve the constraint satisfaction problem according to the capability matching condition and, when the capability matching condition is fulfilled, indicating that the production system is capable of implementing the required technical process, assign a production unit having a suitable technical capability to the required technical process.

20. The device of claim 19, further comprising:
   a filter configured to filter a search space for solutions to the constraint satisfaction problem.

21. The device of claim 20, wherein the filter comprises a constraint reasoner, a semantic reasoner, or a combination thereof.

22. A computer program product stored on a device, wherein, when the computer program product is executed, the computer program product causes the device to:
   apply at least one ontology that describes a production system and a technical process;
   form a constraint satisfaction problem, comprising at least one constraint in a form of a capability matching condition, by way of the at least one ontology, wherein the capability matching condition is defined by a requirement for technical capabilities offered by a plurality of production units of the production system to match capabilities required for a required technical process, so that the production system is capable of implementing the required technical process;
   determine solutions to the constraint satisfaction problem according to the capability matching condition;
   assign a production unit having a suitable technical capability to the required technical process when the capability matching condition is fulfilled, indicating that the production system is capable of implementing the required technical process; and
   store or output the determined solutions.

* * * * *